(12) United States Patent
Kwon et al.

(10) Patent No.: US 8,968,695 B2
(45) Date of Patent: Mar. 3, 2015

(54) METHOD OF PRODUCING NANO-SIZE GRAPHENE-BASED MATERIAL AND AN EQUIPMENT FOR PRODUCING THE SAME

(75) Inventors: Young Jin Kwon, Yongin-si (KR); Ja Woon Gu, Ulsan (KR); Won Hyung Park, Ulsan (KR); Cheol Min Shin, Ulsan (KR); Byoung Kyu Ji, Ulsan (KR); Doo Hyo Kwon, Ulsan (KR)

(73) Assignee: IDT International Co., Ltd., Ulsan (KR)

( * ) Notice: Subject to any disclaimer, the term of this patent is extended or adjusted under 35 U.S.C. 154(b) by 308 days.

(21) Appl. No.: 13/389,868
(22) PCT Filed: Aug. 11, 2009
(86) PCT No.: PCT/KR2009/004465
§ 371 (c)(1), (2), (4) Date: Feb. 15, 2012
(87) PCT Pub. No.: WO2011/019095
PCT Pub. Date: Feb. 17, 2011

(65) Prior Publication Data
US 2012/0201738 A1 Aug. 9, 2012

(30) Foreign Application Priority Data
Aug. 10, 2009 (KR) .......... 10-2009-0073152

(51) Int. Cl.
*C01B 31/00* (2006.01)
*B01J 8/08* (2006.01)
(Continued)

(52) U.S. Cl.
CPC ............. *C01B 31/043* (2013.01); *B01J 6/004* (2013.01); *B01J 19/0093* (2013.01); *B82Y 30/00* (2013.01);
(Continued)

(58) Field of Classification Search
CPC ............... B01J 6/004; B01J 19/0093; B01J 2219/0081; B01J 2219/00867; B01J 2219/00873; C01B 31/0438; C01B 31/043; C01B 31/0469; C01B 31/0476; B82Y 40/00; B82Y 30/00

USPC .......... 423/445 R, 448, 414, 415.1
See application file for complete search history.

(56) References Cited

U.S. PATENT DOCUMENTS

| 2006/0293443 A1 | 12/2006 | Reinheimer et al. |
| 2007/0092432 A1 | 4/2007 | Prud'Homme et al. |

(Continued)

FOREIGN PATENT DOCUMENTS

| CN | 1884060 | 12/2006 |
| JP | 2001-256976 A | 9/2001 |

(Continued)

OTHER PUBLICATIONS

"International Search Report" for PCT/KR2009/004465, 4 pages, The International Searching Authority/KR, Daejeon, Republic of Korea.

(Continued)

*Primary Examiner* — Daniel C McCracken
(74) *Attorney, Agent, or Firm* — Greer Burns & Crain Ltd.

(57) ABSTRACT

The present invention is directed to a method of producing nano-size graphene-based material and an equipment for producing the same. The present invention provides a method of producing graphitic oxide by forcing graphite sulfuric slurry and $KMnO_4$ sulfuric solution into a lengthy micro-channel and by sustaining the mixture of the said graphite sulfuric slurry and the said $KMnO_4$ sulfuric solution in the said micro-channel at predetermined temperatures, by putting the said aqua solution of hydrogen peroxide to the reaction mixture to terminate oxidation, and by washing and drying the reaction mixture. The present invention provides a method of producing nano-size graphene-based material by exfoliating graphitic oxide by thermal shock in a vertical fluidized furnace. According to the present invention, graphitic oxide can be produced massively without risks of explosion by forcing all reagents as liquid phase continuously into a lengthy micro-channel surrounded and thermally controlled strictly by heat exchangers. Nano-size graphene-based material derived by exfoliating thus produced graphitic oxide can be imported into compositions and composites for various uses since it has physical characteristics comparable to carbon nanotube and dispersibility superior to carbon nanotube via residual functional groups.

10 Claims, 2 Drawing Sheets

(51) Int. Cl.
*C01B 31/04* (2006.01)
*B01J 6/00* (2006.01)
*B01J 19/00* (2006.01)
*B82Y 30/00* (2011.01)
*B82Y 40/00* (2011.01)

(52) U.S. Cl.
CPC .............. *B82Y 40/00* (2013.01); *C01B 31/0469* (2013.01); *C01B 31/0476* (2013.01); *C01B 31/0438* (2013.01); *B01J 2219/0081* (2013.01); *B01J 2219/00867* (2013.01); *B01J 2219/00873* (2013.01); *B01J 2219/00932* (2013.01); *C01B 2204/04* (2013.01); *C01B 2204/32* (2013.01); *Y10S 977/734* (2013.01); *Y10S 977/847* (2013.01)
USPC ........ 423/448; 423/415.1; 422/603; 422/233; 977/734; 977/847

(56) References Cited

U.S. PATENT DOCUMENTS

2008/0206124 A1   8/2008   Jang et al.
2009/0092747 A1   4/2009   Zhamu et al.

FOREIGN PATENT DOCUMENTS

WO    WO/03/106386 A2    12/2003
WO    WO 2007/071737 A1    6/2007
WO    WO 2009/049375 A1    4/2009

OTHER PUBLICATIONS

"Written Opinion of the International Searching Authority" for PCT/KR2009/004465, Sep. 8, 2010, 5 pages, The International Searching Authority/KR, Daejeon, Republic of Korea.
European Search Report issued in EP App. No. 09848281.3, mailed Sep. 3, 2013.
XP-002711514; WPI/Thompson; pp. 1 and 2 (Mar. 14, 2000).

METHOD OF PRODUCING NANO-SIZE GRAPHENE-BASED MATERIAL AND AN EQUIPMENT FOR PRODUCING THE SAME

TECHNICAL FIELD

The present invention is directed to a method of producing nano-size graphene-based material and an equipment for producing the same. In addition, the present invention is directed to a method of producing graphitic oxide, intermediate for graphene-based material and equipment for producing graphitic oxide.

BACKGROUND ART

Graphene is single planar carbon material having honeycomb crystal lattice the structure of which is formed of carbons by $sp^2$ hybridization bonding and was discovered most recently among carbon nanostructures. The shape of graphene is the same as that of a single layer derived by fully severance between layers from graphite which is stacked layers of carbon honeycomb crystal lattice.

In 2004, professor Andre Geim and et al from University of Manchester isolated graphene by peeling it off from graphite with Scotch tape and found excellent electric conductivity of the graphene so acquired by study of quantum hole effect. Thereafter, in 2008, James Hone and et al, researchers from university of Colombia confirmed the superior strength of graphene. In the same year, Alexander Balandin and et al, researchers from University of Riverside, Calif., measured the thermal conductivity of graphene as 5300 pW/mpK, which is double that of carbon nano-tube.

Longitudinal scission of carbon nanotube makes graphene structure and infinite enlargement of wall in carbon nanotube of single wall makes it similar to graphene. Therefore, the electronic, thermal and mechanical properties of graphene are expected to be comparable to those of carbon nano-tubes.

For preparation of graphene, drawing method by mechanical exfoliation (repeated peeling) of graphite crystals by the above-mentioned Andre Geim, epitaxial growth on substrates, hydrazine reduction on graphitic oxide paper, chemical vapor deposition and cutting open of nanotubes in solution of potassium permanganate and sulfuric acid have been known but none of them go beyond laboratory preparation levels.

On the other hand, the method of producing expanded graphite, the shape of which is worm-like or accordion-like, by adding thermal shock on graphite intercalated with acids or so on has been known since long before. Such worm-like expanded graphite is used as fillers or is rolled into sheets having anisotropic conductivity. Such expanded graphite resulting from loose bonding between layers of graphite is inferior to graphene in physical properties and its particulate size is much bigger than graphene.

Staudenmaier method wherein graphite flake is reacted with nitric acid and potassium perchlorinate for days has been known for preparing graphitic oxide. In addition, Hummers, in U.S. Pat. No. 2,798,878, shortened the reaction time by using sulfuric acid, nitric acid and potassium permanganate as oxidants. The mixing of sulfuric acid, nitric acid and potassium permanganate together is exothermic reaction and may cause explosion at around 70° C. or above. In these methods, Graphitic oxide is prepared by batch process in very small amount on each batch.

DISCLOSURE OF INVENTION

Technical Problem

It is an object of the present invention to provide a method of producing massively and economically nano-sized material having structures and characteristics of graphene and an equipment for producing the same.

It is another object of the present invention to provide a method of producing graphitic oxide, intermediate for graphene-based material mentioned above, and equipment for producing graphitic oxide.

Solution to Problem

According to the present invention, there is provided a method of producing graphitic oxide comprising:

1) a step of preparing graphite sulfuric slurry by mixing graphite flake with sulfuric acid;

2) a step of preparing $KMnO_4$ sulfuric solution by dissolving $KMnO_4$ in sulfuric acid;

3) a step of preparing aqua solution of hydrogen peroxide;

4) a step of forcing the said graphite sulfuric slurry into a lengthy micro-channel having a beginning, a reacting portion and an outlet;

5) a step of forcing the said $KMnO_4$ sulfuric solution into the beginning of the said lengthy micro-channel;

6) a step of sustaining the mixture of the said graphite sulfuric slurry and the said $KMnO_4$ sulfuric solution in the said micro-channel at predetermined temperatures;

7) a step of putting the said aqua solution of hydrogen peroxide to the reaction mixture after the step 6);

8) a step of washing the reaction mixture after the step 7); and 9) a step of drying the reaction mixture after the step 8), wherein the step 1) to the step 6) are carried out continuously. At the step 7), the said aqua solution of hydrogen peroxide may be put into the said micro-channel in the vicinity of the outlet or into a separate mixing tank for mixing the said aqua solution of hydrogen peroxide with the reaction mixture.

if necessary, the method of producing graphitic oxide may further comprises a step of filtering the reaction mixture after the step 6).

According to the present invention, there is also provided a method of producing nano-size graphene-based material:

10) a step of pouring the graphitic oxide into a vertical fluidized furnace in reducing atmosphere;

11) a step of expanding the falling graphitic oxide by heating in the vertical fluidized furnace;

12) a step of collecting nano-size graphene-based material produced and carried on ascending flow near the ceiling of the vertical fluidized furnace;

13) a step of separating and storing the nano-size graphene-based material: and, if necessary, 14) a step of resupplying the furnace gas separated through the step 13) to the furnace with atmospheric gas.

According to the present invention, there is also provided equipment for producing continuously graphitic oxide comprising:

a supplying unit for graphite sulfuric slurry;
a supplying unit for $KMnO_4$ sulfuric solution;
a supplying unit for aqua solution of hydrogen peroxide;
a micro-reactor including multiple micro-channel modules surrounded by heat-exchangers for constituting one lengthy micro-channel having a beginning connected to the said supplying unit for graphite sulfuric slurry and connected to the said supplying unit for KMnO$_4$ sulfuric solution, a reacting portion and an outlet;

if necessary, a filtering unit for the reaction mixture connected to the micro-reactor;

a mixing unit for mixing the reaction mixture with aqua solution of hydrogen peroxide connected to the micro-channel in the vicinity of its outlet;

a washing unit connected to the mixing unit; and a drying unit connected to the washing unit;

The mixing unit for mixing the reaction mixture with aqua solution of hydrogen peroxide may be incorporated as a part of the micro-channel or be built separately from the micro-channel. The reaction mixture discharged is washed and dried by a washing unit and a drying unit respectively to obtain final graphitic oxide. The said supplying unit for graphite sulfuric slurry and the said supplying unit for KMnO$_4$ sulfuric solution are connected together to the beginning of the micro-channel or connected apart to the beginning of the micro-channel. For example, the said supplying unit for KMnO$_4$ sulfuric solution is connected to a latter portion of the beginning of the micro-channel while the said supplying unit for graphite sulfuric slurry is connected to a former portion thereof.

According to the present invention, there is also provided equipment for producing nano-size graphene-based material continuously comprising:

a supplying unit for graphitic oxide;

a vertical fluidized furnace having a lower inlet for taking in reducing atmospheric gas and an upper inlet connected to the supplying unit for the graphitic oxide;

a collector with its inlet mounted under the ceiling of the vertical furnace for collecting produced nano-size graphene-based material; and, if necessary;

a cyclone having an inlet connected to the collector, a storage for the nano-size graphene-based material and an outlet connected to the lower inlet of the vertical furnace to resupply separated atmospheric gas to the vertical furnace.

Graphene is single planar carbon material having honeycomb crystal lattice. In the present invention, nano-size graphene-based material is defined as single and multiple layers of graphene having less than 100 nm thickness and not showing any distinct peaks more than traces in the range $2\theta < 2°$. The nano-size graphene-based material has surface area 300~3000 m2/g and residual oxygen of less than 1.0 weight %. Graphite is stacked layers of graphene with the distance between layers 3.35 Å apart showing a peak at $2\theta=26.5$ by XRD, while the graphitic oxide in this invention means fully oxidized graphite having functional groups including oxygen such as carboxyl group, hydroxyl or so and showing a peak at $2\theta=10-15$ by XRD due to loosening the distance between layers. By thermal shock, the graphitic oxide is converted to nano-size graphene-based material by separation between layers.

The said graphite sulfuric slurry is prepared by dispersing graphite flake of generally 1 to 200 μm, preferably 5 to 50 μm in size in concentrated sulfuric acid, preferably 97 weight % or more sulfuric acid, in the ratio of 1:10 to 1:100, preferably 1:30 to 1:50 based on graphite to sulfuric acid by weight. Graphite flake of too small size does not well form graphene by exfoliation since expanding pressure decreases as weight density gets lower, while graphite flake of too large size hinders mass mixing and mass transfer in the micro-channel. Since the oxidation reactivity becomes higher as the concentration of sulfuric acid increases, concentrated sulfuric acid of more than 97 weight % is desirable. Too high weight ratio of graphite to sulfuric acid hinders mass mixing and mass transfer in the micro-channel due to high viscosity, while too low weight ratio of graphite to sulfuric acid lowers reaction efficiency and increases the amount of exhausted sulfuric acid. The graphite sulfuric slurry is supplied in a predetermined exact amount by a dosing pump directly connected to the beginning of the micro-channel.

The said KMnO$_4$ sulfuric solution is prepared by dissolving KMnO$_4$ powder in concentrated sulfuric acid, preferably 97 weight % or more sulfuric acid, in the ratio of typically 1:5 to 1:50, preferably 1:10 to 1:30 based on KMnO$_4$ to sulfuric acid by weight. KMnO$_4$ is added safely and easily to the reaction mixture in the micro-channel as solution type. The said KMnO$_4$ sulfuric solution is supplied in a predetermined exact amount by another dosing pump directly connected to the beginning of the micro-channel.

The concentration of the said aqua solution of hydrogen peroxide is not specially limited but generally 1 to 10 w %, preferably 2 to 7 w %. The weight ratio of graphite to aqua solution of hydrogen peroxide is not limited specifically, but is empirically in the ratio of 1:10 to 1:100, preferably 1:30 to 1:50 like the ratio of graphite to sulfuric acid in the graphite sulfuric slurry. The said aqua solution of hydrogen peroxide terminates the oxidation of graphite by reducing extra KMnO$_4$. Too much hydrogen peroxide causes higher washing and drying costs, while too little hydrogen peroxide does not terminate the oxidation reaction. Retention time for the reduction is within several tens of minutes after the said aqua solution of hydrogen peroxide is added.

The reaction mixture in the micro-channel is maintained between 0° C. to 50° C., preferably 20° C. to 35° C. after the said KMnO$_4$ sulfuric solution is added to the said graphite sulfuric slurry. The efficiency of reaction is low at lower temperature, but danger of explosion exists above 70° C. exists. The micro-channel, especially a reacting portion thereof is strictly controlled within the range of the temperatures to prevent explosion caused by local overheating. The micro-channel is surrounded by heat-exchangers having cooling means.

The micro-channel is 1 μm to several tens of mm, preferably 1 μm to several mm, most preferably 1 μm to 1 mm in inner diameter formed in anti-corrosive and anti-acidic material. Inner diameter of the micro-channel of less than several tens of mm is favorable to maintaining the reaction mixture within the range of temperatures to prevent explosion. In addition, less than several mm of inner diameter is favorable to efficiency of reaction due to thorough mixing. Accordingly, 1 μm to 1 mm of inner diameter is most preferable to promote reaction efficiency and to secure safe operation. The reaction mixture moves typically at the speed of several centimeters to several meters per second, preferably several centimeters to several tens of centimeters per second. The reaction mixture sustains in the micro-channel for several minutes to several hours preferably, for several minutes to two hours most preferably after KMnO$_4$ sulfuric solution is added to the graphite sulfuric slurry.

The said graphite sulfuric slurry, the said KMnO$_4$ sulfuric solution and the said aqua solution of hydrogen peroxide are supplied in the strictly controlled amount into the micro-channel by corresponding dosing pumps. Especially, the said graphite sulfuric slurry and the said KMnO$_4$ sulfuric solution are desirably supplied in sufficient pressure and at sufficient speed to the micro-channel to cause turbulent flow in the channel.

The reaction mixture is discharged from an outlet of the micro-reactor after the said aqua solution of hydrogen peroxide is added to reduce extra KMnO$_4$ and to terminate oxidation. The discharged reaction mixture is washed once or more by pure water or a little acidic water of pH=5~6 and dried below 200° C., preferably under vacuum within 48 hours at 80° C. The washing and the drying may be carried out continuously following the former procedures or separately.

According to the present invention, graphitic oxide may be converted to nano-size graphene-based material through thermal shock using a vertical fluidized furnace. To elaborate, graphitic oxide washed and dried according to the present invention is poured into the vertical fluidized furnace with ascending flow formed inside by atmospheric gas. The heating in the furnace is achieved by ordinary heaters or by microwave. The ascending flow is generated by the blow pressure of atmospheric gas or convection current caused by heating. The atmospheric gas is produced by adding hydrogen gas to inert carrier gas such as nitrogen and argon. The temperature in the furnace is maintained at 500° C. to 1100° C. Falling graphitic oxide particles are expanded and split in a layer or layers, and split layers of graphene are floating carried by ascending flow and are picked at the inlet of the collector mounted under the ceiling of the furnace. If necessary, nano-size graphene-based material is separated by cyclone. Fred atmospheric gas by the cyclone may be fed back to the furnace.

Advantageous Effects of Invention

According to the present invention, graphitic oxide can be produced massively without risks of explosion by forcing all reagents as liquid phase continuously into a lengthy micro-channel surrounded and thermally controlled strictly by heat exchangers. Nano-size graphene-based material derived by exfoliating thus produced graphitic oxide can be imported into compositions and composites for various uses since it has physical characteristics comparable to carbon nanotube and dispersibility superior to carbon nanotube via residual functional groups.

BEST MODE FOR CARRYING OUT THE INVENTION

Hereinafter, exemplary embodiments of the invention will be described in detail with reference to the accompanying drawings, but they should not be construed to limit the scope of the present invention. Various alternatives or modifications would be possible while they would be within the scope of the present invention.

Figure 1:
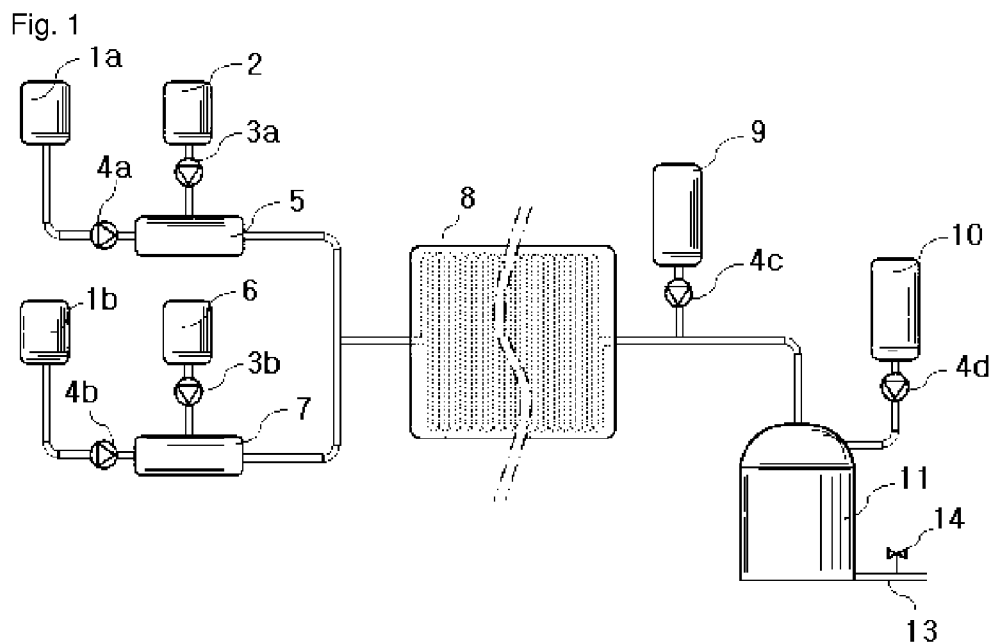
FIG. 1 is a schematic flow chart showing an embodiment for equipment of producing graphitic oxide according to the present invention.
Figure 2:
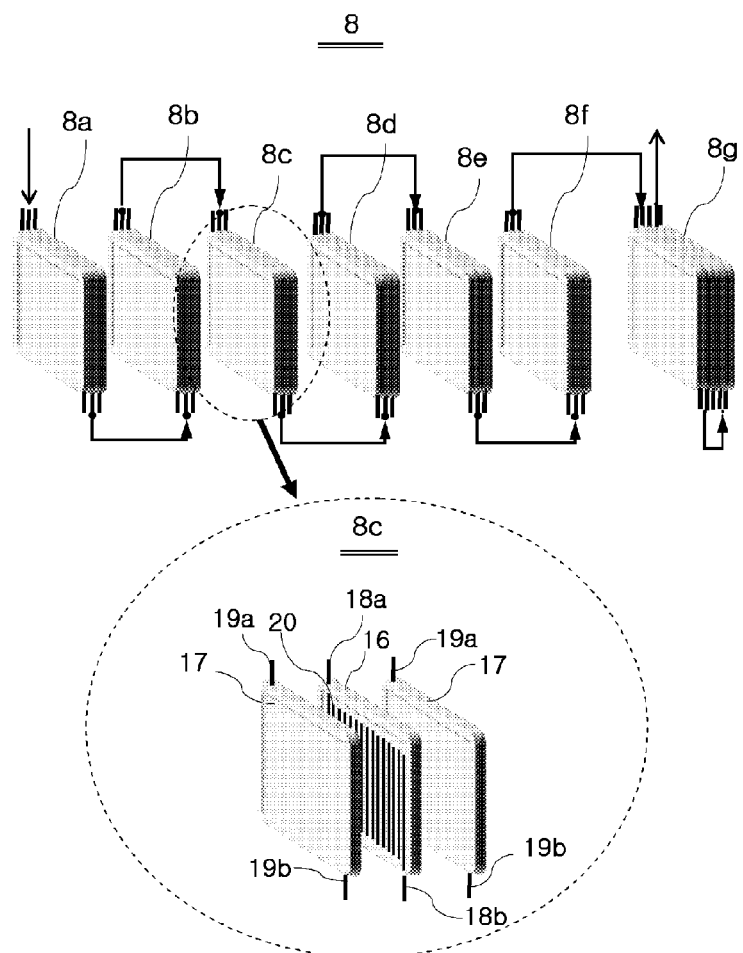
FIG. 2 is a partial disintegrated perspective view of the micro-reactor in the equipment shown in FIG. 1.

FIG. 1 and FIG. 2 describe a method of producing graphitic oxide and an equipment for producing the same as embodiments of the present invention. A micro-reactor (8) consists of multiple micro-channel modules(8a, 8b, 8c, 8d, 8e, 8f, 8g) surrounded by heat-exchangers(17) to form one linked lengthy micro-channel of 1 μm to several mm in inner diameter. The linked micro-channel starts at the beginning, run through the multiple micro-channel modules(8a, 8b, 8c, 8d, 8e, 8f, 8g) and end at the outlet.

Graphite sulfuric slurry is made by mixing, in a premixer (7), sulfuric acid supplied by a dosing pump(4b) for liquid and graphite flake supplied by a dosing pump(3b) for powder and is forced into the beginning of the micro-channel(20). $KMnO_4$ sulfuric solution is made by mixing, in a premixer(5), sulfuric acid supplied by a dosing pump(4a) for liquid and graphite flake supplied by a dosing pump(3a) for liquid and is forced into the beginning of the micro-channel(20).

A micro-reactor(8) consists of multiple micro-channel modules(8a, 8b, 8c, 8d, 8e, 8f, 8g) surrounded by heat-exchangers(17) to control temperature strictly. Each micro-channel module has a channel(20), an entrance(18a) and exit (18b) and is connected to each other through the entrance (18a) and the exit(18b) to constitute one lengthy micro-channel(20). Each micro-channel plane(18) is inserted between two plain heat-exchangers having an entrance(19a) and an exit(19b) for cooling medium to constitute one micro-channel module(8c). Micro-channel modules(8a, 8b, 8c, 8d, 8e, 8f, 8g) are desirably stacked to spare space with insulations inserted between modules. In the vicinity of the beginning of the micro-channel, the temperature is desirably controlled at the lower portion of the region ranging 0° C. to 35° C. considering fluctuations of inflow and safe mixing rather than efficiency of reaction. In the latter part of the reacting portion in the micro-channel, the temperature is desirably controlled around 35° C. to maintain the reaction speed on a higher level.

The graphite sulfuric slurry and the $KMnO_4$ sulfuric solution are mixed together in the micro-channel(20) and the reaction mixture is running in the channel for about 20 minutes. To the reaction mixture flowing into the hydrogen peroxide mixing tank(11) after dilution with pure water, 3 w % aqua solution of hydrogen peroxide is added to terminate the oxidation. Discharged reaction mixture from the hydrogen peroxide mixing tank(11) is washed and dried(not shown in the figures) to obtain graphitic oxide.

Figure 3:
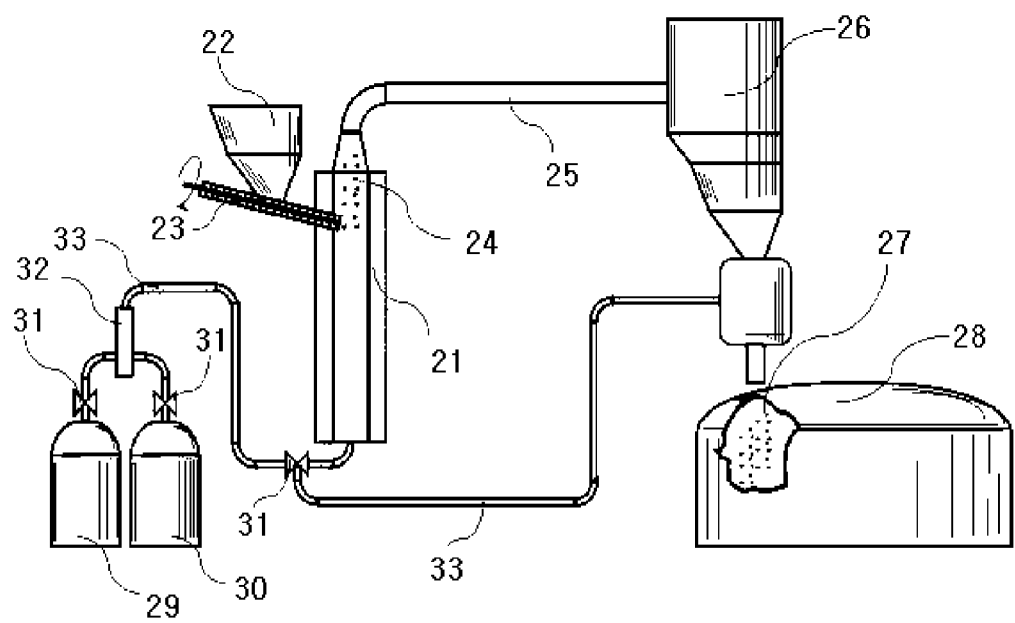
FIG. 3 is a schematic flow chart showing an embodiment for equipment of producing nano-size graphene-based material according to the present invention.

FIG. 3 describes one embodiment of the conversion from graphitic oxide to nano-size graphene-based material according to the present invention. By a supplier(23) graphitic oxide washed and dried according to the present invention is poured into the vertical fluidized furnace(21) with inner temperature maintained at around 800° C. The falling graphitic oxide(24) in the furnace(21) is expanded and split in a layer or layers, and split layers of graphene are floating carried by ascending flow and are picked and absorbed at the inlet of the collector (25) mounted under the ceiling of the furnace(21). nano-size graphene-based material is separated by cyclone(26). Separated furnace gas through cyclone(26) is resupplied to the lower inlet of the furnace(21) with atmospheric gas supplied via a pipe(33) and a gas mixer(32) connected to the nitrogen tank(29) and the hydrogen tank(30). Isolated nano-size graphene-based material is collected at a storage(28) at the bottom of cyclone(26).

Industrial Applicability

According to the present invention, graphitic oxide, intermediate for graphene-based material can be produced economically and massively. Also according to the present invention, the nano-size graphene-based material made by exfoliating thus produced graphitic oxide can be used in various fields such as polymeric composites, fillers, rechargeable batteries, transistors, super-capacitor, containers for storing hydrogen and bio-sensors utilizing electronic, thermal and mechanical properties and flexibility of graphene comparable to carbon nanotube, and high surface area and dispersibility superior to carbon nanotube.

The invention claimed is:

1. A producing method for a graphitic oxide, comprising:
   1) a step of preparing a graphite sulfuric slurry by mixing graphite flake with sulfuric acid;
   2) a step of preparing a $KMnO_4$ sulfuric solution by dissolving $KMnO_4$ in sulfuric acid;
   3) a step of preparing an aqueous solution of hydrogen peroxide;
   4) a step of forcing the graphite sulfuric slurry into a lengthy micro-channel having an inlet, a reacting portion and an outlet;
   5) a step of forcing the $KMnO_4$ sulfuric solution into the inlet of the lengthy micro-channel;
   6) a step of sustaining a reaction mixture of the graphite sulfuric slurry and the $KMnO_4$ sulfuric solution in the micro-channel at a predetermined temperatures;
   7) a step of putting the aqueous solution of hydrogen peroxide to the reaction mixture after the step 6);
   8) a step of washing the reaction mixture after the step 7); and
   9) a step of drying the reaction mixture after the step 8), wherein the steps 1) to 6) are continuously carried out.

2. The producing method of claim 1, further comprising a step of filtering the reaction mixture after the step 6).

3. The producing method of claim 1, wherein the step 7) is carried out for the reaction mixture discharged from the outlet of the lengthy micro-channel by a separate mixing tank.

4. The producing method of claim 1, wherein the step of forcing the $KMnO_4$ sulfuric solution into the inlet of the lengthy micro-channel is the next step of the step of forcing the graphite sulfuric slurry into the inlet of the lengthy micro-channel.

5. The producing method of claim 4, wherein a flake size of the graphite flake is from 1 to 200 μm, a ratio of the graphite flake to the sulfuric acid by weight is from 1:10 to 1:100 in the graphite sulfuric slurry, a ratio of $KMnO_4$ to the sulfuric acid by weight is from 1:5 to 1:50 in the $KMnO_4$ sulfuric solution, the a concentration of the sulfuric acid is 97 wt % or more, the reaction mixture in the micro-channel is maintained at a temperature of from 0° C. to 50° C., the micro-channel is from 1 μm to several tens mm in its inner diameter, and the reaction portion of the micro-channel is surrounded by heat-exchangers.

6. The producing method of claim 5, wherein the flake size of the graphite flake is from 5 to 50 μm, the ratio of the graphite flake to the sulfuric acid by weight is from 1:30 to 1:50 in the graphite sulfuric slurry, the ratio of $KMnO_4$ to the sulfuric acid by weight is from 1:10 to 1:30 in the $KMnO_4$ sulfuric solution, a concentration of the aqueous solution of hydrogen peroxide is from 2 to 7 wt % and a weight ratio of the graphite flake to the aqueous solution of hydrogen peroxide is from 1:30 to 1:50 based on hydrogen peroxide 3 wt % aqueous solution, the reaction mixture in the micro-channel is maintained at a temperature of from 20° C. to 35° C., the micro-channel is from 1 μm to 1 mm in its inner diameter, the reaction portion of the micro-channel has a length ranging from several minutes to 2 hours of retention time, and the reaction mixture moves at a speed of from several centimeters to several tens of centimeters per second in the micro-channel.

7. A producing method for a nano-size graphene-based material, comprising:
   1) a step of preparing a graphite sulfuric slurry by mixing graphite flake with sulfuric acid;
   2) a step of preparing a $KMnO_4$ sulfuric solution by dissolving $KMnO_4$ in sulfuric acid;
   3) a step of preparing an aqueous solution of hydrogen peroxide;
   4) a step of forcing the graphite sulfuric slurry into a lengthy micro-channel having an inlet, a reacting portion and an outlet;
   5) a step of forcing the $KMnO_4$ sulfuric solution into the inlet of the lengthy micro-channel;
   6) a step of sustaining a reaction mixture of the graphite sulfuric slurry and the $KMnO_4$ sulfuric solution in the micro-channel at a predetermined temperatures;
   7) a step of putting the aqueous solution of hydrogen peroxide to the reaction mixture after the step 6);
   8) a step of washing the reaction mixture after the step 7);
   9) a step of drying the reaction mixture after the step 8) to obtain graphitic oxide;
   10) a step of pouring the graphitic oxide obtained by the step 9) into a vertical fluidized furnace in reducing atmosphere;
   11) a step of expanding the graphitic oxide falling in the vertical fluidized furnace;
   12) a step of collecting a nano-size graphene-based material produced and carried on ascending flow near a ceiling of the vertical fluidized furnace; and
   13) a step of separating and storing the nano-size graphene-based material,
   wherein the step 1) to the step 6) and the step 10) to the step 13) are continuously carried out.

8. The producing method of claim 7, wherein the nano-size graphene-based material has thickness of less than 100 nm, and has a surface area ranging from 300 to 3000 $m^2/g$, and residual oxygen of less than 1.0 wt %.

9. The producing method of claim 8, wherein a flake size of the graphite flake is from 1 to 200 μm, a ratio of graphite flake to the sulfuric acid by weight is from 1:10 to 1:100 in the graphite sulfuric slurry, a ratio of $KMnO_4$ to the sulfuric acid by weight is from 1:5 to 1:50 in the $KMnO_4$ sulfuric solution, a concentration of the sulfuric acid is 97 wt % or more, the reaction mixture in the micro-channel is maintained at a temperature of from 0° C. to 50° C., the micro-channel is from 1 μm to several tens of mm in its inner diameter, and the reaction portion of the micro-channel is surrounded by heat-exchangers.

10. The producing method of claim 9, wherein the flake size of the graphite flake is from 5 to 50 μm, the ratio of graphite flake to the sulfuric acid by weight is from 1:30 to 1:50 in the graphite sulfuric slurry, the ratio of $KMnO_4$ to the sulfuric acid by weight is from 1:10 to 1:30 in the $KMnO_4$ sulfuric solution, a concentration of the aqueous solution of hydrogen peroxide is from 2 to 7 wt % and a weight ratio of graphite flake to the aqueous solution of hydrogen peroxide is from 1:30 to 1:50 based on hydrogen peroxide 3 wt % aqueous solution, the reaction mixture in the micro-channel is maintained at a temperature of from 20° C. to 35° C., the micro-channel is from 1 μm to 1 mm in its inner diameter, the reaction portion of the micro-channel has a length ranging from several minutes to 2 hours of retention time, and the reaction mixture moves at the speed of from several centimeters to several tens of centimeters per second in the micro-channel.

* * * * *